US006001218A

United States Patent [19]
Hsu et al.

[11] Patent Number: 6,001,218
[45] Date of Patent: *Dec. 14, 1999

[54] PRODUCTION OF SOFT PAPER PRODUCTS FROM OLD NEWSPAPER

[75] Inventors: Jay Chiehlung Hsu, Alpharetta; Nauman Noorali Lakhani, Roswell; Reginald Smith, Dunwoody, all of Ga.

[73] Assignee: Kimberly-Clark Worldwide, Inc., Neenah, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/889,001

[22] Filed: Jul. 7, 1997

Related U.S. Application Data

[63] Continuation of application No. 08/753,462, Nov. 25, 1996, abandoned, which is a continuation-in-part of application No. 08/547,745, Oct. 26, 1995, Pat. No. 5,620,565, which is a continuation-in-part of application No. 08/268,232, Jun. 29, 1994, Pat. No. 5,582,681.

[51] Int. Cl.⁶ .................................................. D21C 5/02
[52] U.S. Cl. ................................ 162/5; 162/72; 162/147; 162/111; 162/13
[58] Field of Search ................................ 162/4, 5, 147, 162/111, 72, 100, 11, 12, 13

[56] References Cited

U.S. PATENT DOCUMENTS

| | | | |
|---|---|---|---|
| 2,110,032 | 3/1938 | Williams | 154/2 |
| 2,582,496 | 1/1952 | Massey et al. | 92/1.5 |
| 2,620,271 | 12/1952 | Ruff et al. | 92/1.5 |
| 2,743,178 | 4/1956 | Krodel et al. | 92/1.5 |
| 2,872,313 | 2/1959 | House et al. | 92/1.4 |
| 2,916,412 | 12/1959 | Altmann et al. | 162/4 |
| 2,959,513 | 11/1960 | Savage | 162/6 |
| 3,047,452 | 7/1962 | DeVos | 162/5 |
| 3,056,713 | 10/1962 | Gartner | 162/5 |
| 3,098,784 | 7/1963 | Gorman, Jr. | 162/5 |
| 3,261,741 | 7/1966 | Bidwell | 162/261 |
| 3,354,028 | 11/1967 | Illingworth et al. | 162/5 |
| 3,392,083 | 7/1968 | Illingworth | 162/5 |
| 3,427,217 | 2/1969 | Miller | 162/6 |
| 3,446,696 | 5/1969 | Illingworth | 162/5 |
| 3,620,909 | 11/1971 | Gleason | 162/8 |
| 3,635,789 | 1/1972 | Green, Jr. | 162/5 |
| 3,812,000 | 5/1974 | Salvucci, Jr. et al. | 162/111 |

(List continued on next page.)

FOREIGN PATENT DOCUMENTS

| | | |
|---|---|---|
| 1114112 | 12/1981 | Canada . |
| 1132309 | 9/1982 | Canada . |
| 1135460 | 11/1982 | Canada . |
| 1229955 | 12/1987 | Canada . |
| 1266354 | 3/1990 | Canada . |
| 1275757 | 11/1990 | Canada . |
| 2064201 | 1/1991 | Canada . |
| 2027385 | 4/1991 | Canada . |
| 2056051 | 5/1992 | Canada . |
| 2098092 | 6/1992 | Canada . |
| 2104962 | 9/1992 | Canada . |
| 2064280 | 10/1992 | Canada . |
| 2076615 | 10/1993 | Canada . |
| 2093260 | 10/1993 | Canada . |
| 2133406 | 11/1993 | Canada . |
| 2137236 | 12/1993 | Canada . |
| 2156598 | 9/1994 | Canada . |
| 2147276 | 3/1995 | Canada . |
| 2152782 | 5/1995 | Canada . |
| 2036313 | 12/1995 | Canada . |
| 40873 | 12/1981 | European Pat. Off. . |
| 0 225 940 | 6/1987 | European Pat. Off. . |
| 0557651A1 | 9/1993 | European Pat. Off. . |
| 0 568 404 | 11/1993 | European Pat. Off. . |
| 2805445 | 9/1978 | Germany . |
| 2901942 | 8/1979 | Germany . |
| 62-97993 | 5/1987 | Japan . |
| 2-80683 | 3/1990 | Japan . |
| 6-49792 | 2/1994 | Japan . |
| 1535001 | 12/1968 | United Kingdom . |
| 2 231 595 | 11/1990 | United Kingdom . |
| 2231595 | 11/1990 | United Kingdom . |
| 91/14819 | 10/1991 | WIPO . |
| 92/21816 | 12/1992 | WIPO . |
| 93/07331 | 4/1993 | WIPO . |
| 95/10661 | 4/1995 | WIPO . |
| 96/00811 | 1/1996 | WIPO . |
| 96/04424 | 2/1996 | WIPO . |
| 97/15711 | 5/1997 | WIPO . |

OTHER PUBLICATIONS

Quaker Chemical Corporation Product Data, *QuaSoft* 206, Tissue and Towel Debonding Agent, Aug. 6, 1996, 1 page.
Quaker Chemical Corporation Product Data, *QuaSoft* 216, Tissue and Towel Debonding Agent, Aug. 22, 1996, 1 page.
Quaker Chemical Corporation Product Data, *QuaSoft* 230, Tissue Debonding Agent, Aug. 6, 1996, 1 page.
Quaker Chemical Corporation product Data, *QuaSoft* 232, Tissue Debonding Agent, Aug. 5, 1996, 1 page.
Quaker Chemical Corporation Product Data, *QuaSoft* 215, Tissue Softening Agent, Aug. 6, 1996, 1 page.
Quaker Chemical Corporation Product Data, *QuaSoft* 219, Tissue Softening Agent, Aug. 6, 1996, 1 page.

(List continued on next page.)

*Primary Examiner*—Stanley S. Silverman
*Assistant Examiner*—José A. Fortuna
*Attorney, Agent, or Firm*—Karl V. Sidor

[57] ABSTRACT

A method of making sanitary paper products from newspapers. The method includes the steps of: (a) pulping newspapers in water with agitation to produce a pulp slurry, the fiber in the newspapers having an oil content ranging from about 0.025% to about 2.0%, by weight, and the slurry having a consistency between about 3% and about 18% and a pH below about 8.0; (b) adding a surfactant to the pulp slurry and maintaining the pulp slurry at a temperature above about 100° F. for at least 15 minutes such that a substantial quantity of the oil in the old newspaper is retained; (c) increasing the consistency of the slurry to between about 3.5% and about 18%; and (d) using the treated pulp as a source of fibers in a paper making process to produce sanitary paper products.

14 Claims, No Drawings

U.S. PATENT DOCUMENTS

| | | | |
|---|---|---|---|
| 3,821,068 | 6/1974 | Shaw | 162/111 |
| 3,833,460 | 9/1974 | Iannazzi et al. | 162/5 |
| 3,873,410 | 3/1975 | Chupka | 162/4 |
| 3,884,750 | 5/1975 | Iannazzi | 162/4 |
| 3,897,301 | 7/1975 | Bauman et al. | 162/189 |
| 3,932,206 | 1/1976 | Illingworth et al. | 162/5 |
| 3,957,572 | 5/1976 | Eriksson | 162/4 |
| 3,994,771 | 11/1976 | Morgan, Jr. et al. | 162/113 |
| 4,076,578 | 2/1978 | Puddington et al. | 162/5 |
| 4,102,737 | 7/1978 | Morton | 162/113 |
| 4,111,730 | 9/1978 | Balatinecz | 156/62.2 |
| 4,129,259 | 12/1978 | Vokes | 241/20 |
| 4,147,616 | 4/1979 | Balcar et al. | 209/12 |
| 4,157,952 | 6/1979 | Krofta | 209/170 |
| 4,158,594 | 6/1979 | Becker et al. | 162/112 |
| 4,222,819 | 9/1980 | Fossum et al. | 162/76 |
| 4,231,841 | 11/1980 | Calmanti et al. | 162/5 |
| 4,274,912 | 6/1981 | Carles et al. | 162/41 |
| 4,343,679 | 8/1982 | DeCeuster et al. | 162/4 |
| 4,347,099 | 8/1982 | DeCeuster et al. | 162/5 |
| 4,351,699 | 9/1982 | Osborn, III | 162/112 |
| 4,381,969 | 5/1983 | DeCeuster et al. | 162/5 |
| 4,390,395 | 6/1983 | DeCeuster et al. | 162/5 |
| 4,440,597 | 4/1984 | Wells et al. | 162/111 |
| 4,441,962 | 4/1984 | Osborn, III | 162/111 |
| 4,481,962 | 11/1984 | Osborn, III | 162/111 |
| 4,483,741 | 11/1984 | Maloney et al. | 162/5 |
| 4,487,655 | 12/1984 | Noetzel et al. | 162/5 |
| 4,504,016 | 3/1985 | Wikdahl | 241/24 |
| 4,529,479 | 7/1985 | Tuomi | 162/29 |
| 4,562,969 | 1/1986 | Lindahl | 241/21 |
| 4,613,447 | 9/1986 | Hara et al. | 252/91 |
| 4,618,400 | 10/1986 | Wood et al. | 162/5 |
| 4,668,339 | 5/1987 | Terry | 162/4 |
| 4,704,201 | 11/1987 | Keck et al. | 209/17 |
| 4,710,267 | 12/1987 | Elsby et al. | 162/5 |
| 4,726,880 | 2/1988 | Smith | 162/4 |
| 4,776,926 | 10/1988 | Lindahl | 162/28 |
| 4,780,179 | 10/1988 | Clement | 162/5 |
| 4,845,148 | 7/1989 | Moore et al. | 524/512 |
| 4,865,690 | 9/1989 | Bernard et al. | 162/4 |
| 4,867,383 | 9/1989 | Terry et al. | 241/24 |
| 4,872,953 | 10/1989 | Smith | 162/261 |
| 4,880,498 | 11/1989 | Moore et al. | 162/164.6 |
| 4,904,524 | 2/1990 | Yoh | 428/311.3 |
| 4,909,900 | 3/1990 | Matzke et al. | 162/4 |
| 4,915,821 | 4/1990 | Lamort | 209/17 |
| 4,919,754 | 4/1990 | Mollett et al. | 162/5 |
| 4,923,565 | 5/1990 | Fuentes et al. | 162/72 |
| 4,950,545 | 8/1990 | Walter et al. | 428/446 |
| 4,971,656 | 11/1990 | Lehmann et al. | 162/5 |
| 4,983,258 | 1/1991 | Maxham | 162/189 |
| 5,002,633 | 3/1991 | Maxham | 162/5 |
| 5,013,456 | 5/1991 | St. John et al. | 210/734 |
| 5,048,589 | 9/1991 | Cook et al. | 162/109 |
| 5,059,282 | 10/1991 | Ampulski et al. | 162/111 |
| 5,068,009 | 11/1991 | Jokinen et al. | 162/9 |
| 5,068,279 | 11/1991 | Morse | 524/593 |
| 5,069,751 | 12/1991 | Chamblee et al. | 162/5 |
| 5,073,234 | 12/1991 | Mollett et al. | 162/5 |
| 5,080,759 | 1/1992 | Buzby et al. | 162/158 |
| 5,084,135 | 1/1992 | Brooks et al. | 162/4 |
| 5,102,733 | 4/1992 | Zawadzki | 428/343 |
| 5,110,412 | 5/1992 | Fuentes et al. | 162/5 |
| 5,116,474 | 5/1992 | Fuentes et al. | 162/71 |
| 5,116,746 | 5/1992 | Bernier et al. | 435/172.3 |
| 5,118,389 | 6/1992 | Dubelsten et al. | 162/19 |
| 5,122,228 | 6/1992 | Bouchette et al. | 162/4 |
| 5,131,980 | 7/1992 | Chamblee et al. | 162/4 |
| 5,133,832 | 7/1992 | Gilkey | 162/4 |
| 5,137,599 | 8/1992 | Maxham | 162/5 |
| 5,158,697 | 10/1992 | Kawamori et al. | 252/60 |
| 5,169,497 | 12/1992 | Sarkar et al. | 162/158 |
| 5,179,021 | 1/1993 | du Manoir et al. | 435/278 |
| 5,207,924 | 5/1993 | Reed et al. | 210/734 |
| 5,211,809 | 5/1993 | Naddeo et al. | 162/6 |
| 5,225,046 | 7/1993 | Borchardt | 162/5 |
| 5,227,019 | 7/1993 | Borchardt | 162/6 |
| 5,227,020 | 7/1993 | Endres et al. | 162/8 |
| 5,227,023 | 7/1993 | Pounder et al. | 162/101 |
| 5,228,953 | 7/1993 | Bast et al. | 162/5 |
| 5,234,544 | 8/1993 | Naddeo | 162/5 |
| 5,238,538 | 8/1993 | Jagannadh et al. | 162/4 |
| 5,242,585 | 9/1993 | Krofta | 210/188 |
| 5,246,545 | 9/1993 | Ampulski et al. | 162/112 |
| 5,259,969 | 11/1993 | Srivatsa et al. | 252/60 |
| 5,269,942 | 12/1993 | Harrington, IV et al. | 210/727 |
| 5,271,805 | 12/1993 | Stockel et al. | 162/4 |
| 5,277,758 | 1/1994 | Brooks et al. | 162/4 |
| 5,286,347 | 2/1994 | Richardson | 162/199 |
| 5,286,390 | 2/1994 | Gray et al. | 210/727 |
| 5,302,245 | 4/1994 | Nadeau | 162/8 |
| 5,310,459 | 5/1994 | Krofta | 162/4 |
| 5,314,580 | 5/1994 | DiTullio | 162/5 |
| 5,316,621 | 5/1994 | Kitao et al. | 162/4 |
| 5,324,390 | 6/1994 | Naddeo et al. | 162/6 |
| 5,332,471 | 7/1994 | Naddeo et al. | 162/6 |
| 5,348,620 | 9/1994 | Hermans et al. | 162/9 |
| 5,358,605 | 10/1994 | Dorflinger et al. | 162/4 |
| 5,360,512 | 11/1994 | Blum | 162/8 |
| 5,362,362 | 11/1994 | Cunningham et al. | 162/5 |
| 5,370,770 | 12/1994 | Johnson et al. | 162/6 |
| 5,380,444 | 1/1995 | Ryan et al. | 210/734 |
| 5,382,378 | 1/1995 | Guerrini et al. | 252/181 |
| 5,391,261 | 2/1995 | VanDenBergh | 162/4 |
| 5,399,241 | 3/1995 | Oriaran et al. | 162/112 |
| 5,401,360 | 3/1995 | Galland | 162/8 |
| 5,405,495 | 4/1995 | Cosper et al. | 162/5 |
| 5,405,499 | 4/1995 | Vinson . | |
| 5,409,572 | 4/1995 | Kershaw et al. | 162/109 |
| 5,413,675 | 5/1995 | Ilonomou et al. | 162/5 |
| 5,415,734 | 5/1995 | Backlund et al. | 162/40 |
| 5,417,806 | 5/1995 | Matzke et al. | 162/4 |
| 5,425,899 | 6/1995 | Nguyen et al. | 252/321 |
| 5,429,716 | 7/1995 | Hache et al. | 162/7 |
| 5,433,824 | 7/1995 | Richardson | 162/8 |
| 5,441,601 | 8/1995 | Cosper et al. | 162/5 |
| 5,453,159 | 9/1995 | Markham et al. | 162/4 |
| 5,464,501 | 11/1995 | Kogan et al. | 162/6 |
| 5,466,333 | 11/1995 | Guttag | 162/6 |
| 5,496,439 | 3/1996 | Carlson et al. | 162/4 |
| 5,496,445 | 3/1996 | Stockel et al. | 162/248 |
| 5,501,768 | 3/1996 | Hermans et al. | 162/9 |
| 5,501,774 | 3/1996 | Burke | 162/164.1 |
| 5,503,709 | 4/1996 | Burton | 162/6 |
| 5,505,817 | 4/1996 | Roriguez et al. | 162/5 |
| 5,512,133 | 4/1996 | Markham | 162/4 |
| 5,514,249 | 5/1996 | Cauley et al. | 162/164.1 |
| 5,518,580 | 5/1996 | Ortner et al. | 162/4 |
| 5,520,780 | 5/1996 | Walker | 162/4 |
| 5,525,193 | 6/1996 | Franks et al. | 162/5 |
| 5,529,190 | 6/1996 | Carlton et al. | 209/170 |
| 5,529,660 | 6/1996 | Kogan et al. | 162/4 |
| 5,536,373 | 7/1996 | Carlson et al. | 162/261 |
| 5,538,596 | 7/1996 | Satterfield et al. | 162/164.5 |
| 5,549,787 | 8/1996 | Sain et al. | 162/5 |
| 5,560,805 | 10/1996 | Hamilton et al. | 162/5 |
| 5,562,803 | 10/1996 | Wang et al. | 162/5 |
| 5,567,272 | 10/1996 | Hentzschel et al. | 162/9 |
| 5,571,422 | 11/1996 | Magaraggia | 210/703 |
| 5,575,891 | 11/1996 | Trokhan et al. | 102/111 |
| 5,575,893 | 11/1996 | Khan et al. | 162/199 |

| | | | |
|---|---|---|---|
| 5,580,422 | 12/1996 | Hamilton et al. | 162/4 |
| 5,580,446 | 12/1996 | Markham | 210/202 |
| 5,582,681 | 12/1996 | Back et al. | 162/5 |
| 5,593,937 | 1/1997 | Saito et al. | 503/201 |
| 5,607,544 | 3/1997 | Salzburger et al. | 162/5 |
| 5,618,385 | 4/1997 | Jones et al. | 162/6 |
| 5,620,565 | 4/1997 | Lazorisak et al. | 162/72 |
| 5,622,597 | 4/1997 | Callen et al. | 162/5 |
| 5,624,569 | 4/1997 | Chung et al. | 210/727 |
| 5,626,718 | 5/1997 | Philippe et al. | 162/60 |
| 5,643,409 | 7/1997 | Hamaguchi et al. | 162/5 |
| 5,650,044 | 7/1997 | Serres | 162/4 |
| 5,651,879 | 7/1997 | Gonzalez | 209/170 |
| 5,656,130 | 8/1997 | Ali | 162/65 |

OTHER PUBLICATIONS

Quaker Chemical Corporation Product Data, *QuaSoft* 223C, Towel and Tissue Softener, Aug. 6, 1996, 1 page.

Quaker Chemical Corporation Product Data, *QuaSoft* 228, Towel and Tissue Softener, Aug. 6, 1996, 1 page.

Quaker Chemical Corporation Product Data, *QuaSoft* 275, Towel and Tissue Softener, Aug. 6, 1996, 1 page.

Quaker Chemical Corporation Product Data, *QuaSoft* 218, Tissue Softening Agent, Aug. 6, 1996, 1 page.

Croda Chemicals Ltd., "Solan", Nov. 1991, 3 pgs.

Proquimtex, Celusoft PQ–18, "Agente Suavizante Para Papeles Tissue", Rev. Apr. 7, 1997 (w/attached English language translation: Celusoft PQ–18, "Softener Agent For Tissue Paper").

Proquimtex, Celusoft PQ–20, "Agente Suavizante Para Papeles Tissue", Rev. Mar. 7, 1997 (w/attached English language translation: Celusoft PQ–20, "Softener Agent For Tissue Paper").

Proquimtex, Celusoft PIM–21 DEG, "Agente Suavizante Para Papeles Tissues", Rev. Apr. 7, 1997 (w/attached English language translation: Celusoft PIM–21 DEG, "Softener Agent For Tissue Paper").

Proquimtex, Celusoft PIM–28 DEG, "Agente Suavizante Para Papeles Tissue", Rev. Apr. 7, 1997 (w/attached English language translation: Celusoft PIM–28 DEG, "Softener Agent For Tissue Paper").

Osi Specialities, Inc., Osi Specialities Product Information, "NuWet™ Hydorphilic Finish Silicones for Nonwovens", 1994, 3 pgs.

Henkel Corporation, Henkel Paper Chemicals, Nopcowet® 201 Absorbency Aid Repulping Aid, 1994, 1 page.

Fetterly, N., "The Role of Dispersion Within a Deinking System", *Progress in Paper Recycling,* May 1992, pp. 11–20.

Gallagher, F., "The Big D: Getting Rid of the Ink in Recycled Fiber", *Paper Age, Recycling Annual 1991,* pp. 23, 50.

Heitmann et al., "Enzyme Deinking of Newsprint Waste", from the Fifth International Conference on Biotechnology in the Pulp & Paper Industry, Kyoto, Japan (May 27030, 1992), published by Uni publishers, Tokyo, 1992, pp. 75–80.

Jossinet, J., "Custom De–Inking of Newsprint", *Pulp & Paper Canada,* Mar. 1993, 94(3), T69–T71.

Lorey, F., "Recycling from the Newsprint Perspective", *Paper Age Recycling Annual 1991,* pp. 9, 12, 13.

Ow, S., "Biological De–Inking Methods of Newsprint Wastepaper", *World Pulp & Paper Technology 1992,* Roberts, F. ed., Sterling Publications Intern. Ltd., 4 pages.

Prasad, D.Y. et al., "Enzymatic Deinking of Colored Offset Newspaper", Dept. of Wood and Paper Science, North Carolina State University.

PCT Counterpart Search Report mailed Apr. 18, 1997.

Database WPI, Section CH, Week 9328, Derwent Publications, Ltd., London, GB; Class D16, AN 93–224721 XP002027470 & JP 05 148 794 A (Sanyo Scott KK), Jun. 15, 1993 see abstract.

Christopher J. Biermann, "Essentials of Pulping an Papermaking," Academic Press, Inc. Jan. 1993, pp. 209–212.

United States Statutory Invention Registration; Reg. No.: H1672; Published: Aug. 5, 1997; Filed Apr. 3, 1992; entitled *Tissue Products Made From Low–Coarseness Fibers;* Hermans et al.

Law, K.N. et al., "Effects of recycling on papermaking properties of mechanical and high yield pulps: Part 1: Hardwood pulps", Tappi Journal, Mar. 1996, vol. 79, No. 3, pp. 167–174.

Alanko, K. et al., "Recyclability of thermo–mechanical pulp fibres", Paperi Ja Puu—Paper and Timber, vol. 77, No. 5, 1995, pp. 315–328.

Hollmark, H., "Evaluation of tissue paper softness", Tappi Journal, Feb. 1983, pp. 97–99.

Bates, J.D., "Softness Index: Fact or Mirage?", Tappi Journal, Apr. 1965, vol. 48, No. 4, pp. 63A–64A.

Bierman, C.J., "Paper Manufacture", Essentials of Pulping and Papermaking, Academic Press, Inc., pp. 209–213.

Jackson, L.S. et al., "Enzymatic modifications of secondary fiber", Tappi Journal, Mar. 1993, vol. 76, No. 3, pp. 147–154.

Pommier, "Time for Enzymes?", Paper, vol. 214, No. 5, Oct. 2, 1990, pp. 34–35.

Pommier, J–C. et al., "Using enzymes to improve the process and the product quality in the recycled paper industry, Part 1: the basic laboratory work", Tappi Journal, Jun. 1989, vol. 73, No. 6, pp. 187–191.

Patent Abstracts of Europe, WO 09602700A1, Appl. No. FI 09500367W, Date Filed Jun. 26, 1995, (Ahlstroem Oy).

Patent Abstracts of Europe, DE 04116557A1, Appl. No. DE 04116557A, Date Filed May 21, 1991, (Escher Wyss GmbH).

Patent Abstracts of Japan, 08–127989, Appl. No. 06–265786, Date Filed Oct. 28, 1994, (Honshu Paper Co. Ltd.).

Patent Abstracts of Japan, 05–156584, Appl. No. 03–318149, Date Filed Dec. 2, 1991, (Honshu Paper Co. Ltd. et al.).

Pankaj C. Kapadia, "A Non–Chlorine Repulping Aide", Tappi Proceedings, Papermakers Conference 1992, pp. 51–54.

M. Gilkey et al., "Cold Dispersion Unit Boosts Deinking Efficiency at Japanese Tissue Mills", *Pulp and Paper,* Nov. 1988, pp. 100–103.

Don Mcbride, "Deinking Systems for Office Waste Offer "Pay Now/Pay Later" Choices", *Pulp and Paper,* Apr. 1994, 6 pages.

Annie Renders, "Hydrogen Peroxide and Related Chemical Additives in Deinking Processes", *Tappi Journal,* vol. 76, No. 11, pp. 155–161.

PRODUCTION OF SOFT PAPER PRODUCTS FROM OLD NEWSPAPER

CROSS REFERENCE TO RELATED APPLICATIONS

This application is a continuation of application Ser. No. 08/753,462 entitled "Production of Soft Paper Products From Coarse Cellulosic Fibers" and filed in the U.S. Patent and Trademark Office on Nov. 25, 1996 now abandoned, which is a continuation-in-part of Ser. No. 08/547,745 filed in the U.S. Patent and Trademark Office on Oct. 26, 1995 (now U.S. Pat. No. 5,620,565), which is a continuation-in-part of Ser. No. 08/268,232 filed in the U.S. Patent and Trademark Office on Jun. 29, 1994 (now U.S. Pat. No. 5,582,681). These applications are hereby incorporated by reference in their entirety.

BACKGROUND OF THE INVENTION

In typical papermaking processes, a general correlation exists between fiber coarseness and softness or handfeel of the resulting paper product.

Expensive high quality fibers such as bleached northern softwood kraft fibers are fine, flexible and are used to produce soft, desirable tissue products. In contrast, mechanical pulping of softwoods produces high-yield, coarse, stiff fibers typically used to make newsprint.

Newspapers contain a preponderance of coarse, high yield fibers, typically stone groundwood (SGW), thermomechanical pulp (TMP), and/or chemithermomechanical pulp (CTMP) fibers. Such coarse newsprint fibers are usually highly refined to cause fractures and fibrillations which aid in imparting strength to the resulting newsprint. Such refining changes the freeness of the coarse fiber from "high" freeness fibers to "low" freeness fibers. If such refined, high-yield, coarse, mechanically pulped fibers were used in a tissue making process the resulting sheet is not soft, and therefore much less desirable as a tissue product.

A recent thorough discussion of the relationship between tissue softness and fiber coarseness is contained in Canadian Patent No. 2,076,615. Attempts to produce soft tissue or towel type sanitary paper products from a majority of high yield fibers such as CTMP, TMP or SGW pulp have not been successful. Likewise, producing soft tissue and towel products by recycling old newspapers has not been very successful partially because the predominant fiber in newsprint or in old newspapers are low freeness, coarse, high yield fibers.

Other complicating factors in producing soft tissue and towel products from recycled newspapers are problems with papermachine operation due to poor drainage of low freeness fibers and problems with fines and other substances that accumulate in the papermachine water system (whitewater). These materials make it difficult to crepe the tissue sheet from the Yankee drying cylinder, and therefore necessitate operating the papermachine at conditions which do not promote maximum softness.

Conventional recycling of newspapers/newsprint to obtain fibers comparable to the type of fibers used to originally make the newsprint is known in the art as "deinking" and typically involves pulping, washing (usually with surfactants), screening, centrifugal cleaning, solubilizing insoluble contaminants (usually by strong caustic treatments), washing and bleaching of the fibers to counteract the yellowing effects of caustic treatments.

The first step in conventional recycling of old newspapers is to separate the paper into individual fibers in water to form a pulp slurry. Surfactants and caustic are added to facilitate the solubilization and separation of contaminants from the fibers. This is followed by removing inks and contaminants from the fibers by a combination of various process steps such as screening, centrifugal cleaning, washing, flotation and the like. The screening and centrifugal cleaning steps remove large contaminants such as paper clips, staples, plastics, etc. The primary purpose of washing and flotation steps is to suspend contaminants in the water and to remove the contaminants from the fibers.

When caustic is used to facilitate contaminant removal, some yellowing of the fibers unfortunately occurs due to the caustic treatment. After or during caustic treatment and washing, the fibers are usually bleached (e.g. with hydrogen peroxide) to counteract the yellowing effect of caustic or to produce better fibers having higher brightness than the fibers in the original waste paper. Cleaned, decontaminated, and bleached fibers are usually blended with virgin fibers and then used in a papermaking process for which the fibers properties are suitable. Because the starting fibers are newsprint type fibers (i.e., coarse, low freeness and low brightness fibers) such recycled fibers are most often reused for making blank newsprint. Their high coarseness and low freeness render them unsuitable for making soft tissue products unless blended with a majority of higher quality fibers such as bleached northern softwood kraft pulp.

Conventional pulping of used newspaper to obtain recycled newsprint fiber is usually done in a high attrition pulper at a consistency of 4–8% and at 90° F.–160° F. for 20 minutes to 60 minutes, depending on the exact type of waste paper being processed. Caustic soda or other alkaline substances such as sodium silicate are commonly used to raise the pH of the pulp slurry to pH 9–10 to aid in separating fibers (defibering) and also to loosen the inks and separate dirt from the fiber. At an alkaline pH vegetable oils in the inks are saponified while mineral oils are emulsified by the combination of alkaline pH, soap, and surfactants, all of which enhance the removal of oils during washing. A surfactant deinking aid (for higher pH ranges) is usually added to further help separate inks from fiber.

The caustic step in recycling processes of old newsprint to obtain well cleaned quality fibers causes swelling of the fibers, and usually solubilizes many components. In addition to saponifying vegetable based printing oils, caustic also saponifies natural organic acids typically present in old newspapers to produce the corresponding soaps of the saponifiable materials. The saponified vegetable oils and organic acids so formed aid in removal of other contaminants from the fibers, such as non-saponifiable printing oils (mineral oil). These substances are subsequently removed from the fibers by washing and/or flotation after the caustic treatment.

A major recycler of old newspapers, Garden State Paper, in recent journal articles, one entitled "The Big "'D": Getting Rid of the Ink in Recycled Fiber, appearing in the journal Paper Age, 1991 Recycling Annual, at pages 23 and 50 and the other article entitled "Recycling From the Newsprint Perspective, at pages 9, 12 and 13 of the same 1991 Recycling Annual, (Paper Age, 1991 Recycling Annual) describes its newsprint recycling and deinking processes cleaning and screening followed by a series of 3 washings facilitated by the addition of chemicals to emulsify the printing oils and resins. Again the aim of this process is to remove printing ink constituents, including oils, as completely as possible. This is especially important because the recycled newsprint fiber is made into blank newsprint paper which would not have adequate brightness or strength without removing the ink constituents.

There is a long felt and unmet need for a soft paper product made from high-yield, coarse, fibers. There is also a need for an economical and practical process of treating high-yield, coarse fibers so they are suitable for making soft paper products. This need also extends to a process for treating newspapers/newsprint fibers so they are suitable for making soft paper products as well as soft paper products containing such treated fibers.

SUMMARY OF THE INVENTION

The present invention addresses the needs described above by providing a method of modifying coarse high yield type pulp into pulps suitable for making soft tissue type products.

Coarse, low freeness, high yield type pulp is also found in newsprint (i.e., newspapers), and in accordance with the present invention, can be modified to produce soft tissue products by retaining or adding certain types of oils typically found in newsprint ink on or in the fibers while the fibers are swelled in water and a surfactant. The same fibers, when not containing these oily materials and treated with a surfactant do not produce soft tissue products.

Virgin, coarse, high yield fibers (e.g. stone groundwood, thermomechanical and chemithermomechanical pulps) can be made suitable for producing soft tissue type products by addition of oils typically found in newspaper inks and subjecting the intentionally oil treated virgin fibers to appropriate surfactant treatment. Novel fibers and sanitary paper products containing a majority of surfactant treated coarse, high yield type fibers having oily materials are produced according to the present invention.

The method of making sanitary paper products from newspapers includes the steps of: (a) pulping newspapers in water with agitation to produce a pulp slurry, the fiber in the newspapers having an oil content ranging from about 0.025% to about 2.0%, by weight, and the slurry having a consistency between about 3% and about 18% and a pH below about 8.0; (b) adding a surfactant to the pulp slurry and maintaining the pulp slurry at a temperature above about 100° F. for at least 15 minutes such that a substantial quantity of the oil in the old newspaper is retained; (c) increasing the consistency of the slurry to between about 3.5% and about 18%(utilizing, for example, a washing or dewatering step); and (d) using the treated pulp as a source of fibers in a paper making process to produce sanitary paper products.

The surfactant may be selected from nonionic surfactants, cationic surfactants, anionic surfactants and/or combinations thereof. The surfactant is desirably present in an amount from about 0.025% to about 0.75%, by weight (based on the weight of the dry fibers). In an aspect of the invention, the surfactant may be added to the pulp slurry prior to the completion of the pulping step.

The method of the invention may also include a refining step prior to the step of using the treated pulp as a source of fibers in a paper making process to produce sanitary paper products.

Generally speaking, the pH of the pulp slurry is maintained between below about 8. For example, the pH of the pulp slurry may be maintained between about 4 and 7.

According to the invention, the pH and chemical additions to the pulp slurry formed from newspapers are insufficient to saponify the oily components. The fiber in the newspapers should have an oil content ranging from about 0.025% to about 2.0%, by weight, and the slurry may have a consistency between about 3% and about 18%, for example, from about 3% to about 10%.

The method of making sanitary paper products from virgin coarse cellulosic fibers includes the steps of: (a) pulping coarse cellulosic fibers in water with agitation to produce a pulp slurry, the slurry having a consistency between about 3% and about 18% and a pH below about 8.0; (b) adding a surfactant to the pulp slurry and maintaining the pulp slurry at a temperature above about 100° F. for at least 15 minutes; (c) dewatering the slurry to a consistency of from about 15% to about 35%; (d) crumbing the dewatered slurry to produce crumbed fiber; (e) passing the crumbed fiber through a fiber disperser and mixing printing ink oil with the fiber while maintaining the fibers at a temperature of about 100° F. to produce treated pulp containing oily products; and (f) using the treated pulp as a source of fibers in a paper making process to produce sanitary paper products.

The surfactant may be selected from nonionic surfactants, cationic surfactants and combinations thereof. The surfactant is desirably present in an amount from about 0.025% to about 0.75%, by weight (based on the weight of the dry fibers). In an aspect of the invention, the surfactant may be added to the pulp slurry prior to the completion of the pulping step.

The method of the invention may also include a refining step prior to the step of using the treated pulp as a source of fibers in a paper making process to produce sanitary paper products.

Generally speaking, the pH of the pulp slurry is maintained between below about 8. For example, the pH of the pulp slurry may be maintained between about 4 and 7.

The coarse cellulosic fibers desirably have a coarseness of greater than about 17 mg/100 meters.

According to the method of the invention, the printing ink oil may be mixed with the fiber while maintaining the fibers at a temperature of about 100° F. or above. Desirably, the printing ink oil may be mixed with the fiber while maintaining the fibers at a temperature of about 180° F.

The method of the present invention described above may further include the steps of: introducing the treated pulp at a papermaking consistency into the headbox (or machine chest) of a paper making machine; adding a surfactant system to the treated pulp; and utilizing the treated pulp in a paper making process to produce sanitary paper products.

The surfactant system may be composed of a mixture of nonionic and cationic surfactants. The surfactant system may be added to the treated pulp in an amount from about 0.01% to about 1.5% based on the weight of dry fiber. For example, the surfactant system may be added to the treated pulp in an amount of from about 0.05% to about 0.75% based on the weight of dry fiber. The treated pulp may be introduced into the paper making machine at a papermaking consistency ranging from about 1.0% to about 0.05%.

The present invention encompasses the method described above wherein the sanitary paper product made using the treated pulp is a tissue paper made at a basis weight between 7 and 35 pounds per ream. The sanitary paper product may also be a paper napkin made at a basis weight between 7 and 35 pounds per ream. The sanitary paper product may also be a paper towel made at a basis weight between 12 and 40 pounds per ream.

The novel sanitary paper products are desirably made of cellulosic fibers at least 80% of which are coarse fibers having a Kajaani coarseness greater than 17 milligrams per 100 meters, and has a basis weight of between 7 pounds per ream and 40 pounds per ream, a Normalized Tensile Strength (metric) of between 5.0 and 20.0, and containing from about 0.025% to about 2.0% of an oil selected from the group consisting of vegetable oils, mineral oils, lanolin oils and derivatives thereof.

The present invention also encompasses a method of modifying cellulosic fibers to improve their tissue and towel making properties. The method of modifying cellulosic fibers includes the steps of:

(a) adding between 0.025% and 2.0% of a mineral oil, vegetable oil, lanolin oil or their derivatives to coarse cellulosic fibers at a consistency at 15% to 35% or greater, crumbing the fibers and passing the crumbed fibers through a fiber disperser while maintaining the fibers at a temperature of about 100° F. or above and mixing printing grade oil with the fibers; and (b) adding from about 0.025% to about 0.75%, by weight, of a surfactant to the furnish at a consistency of between 3% and 18% and at a temperature between about 100° F. and 140° F. for at least 15 minutes.

The present invention encompasses and improved cellulosic fiber for making sanitary paper products disclosed herein which is surfactant and oil modified cellulosic fiber having a Kajaani fiber coarseness greater than 17 milligrams/100 meters and containing between 0.025% and 2.0% of oil selected from the group consisting of vegetable oils, mineral oils, lanolin oils and derivatives thereof.

DESCRIPTION OF THE INVENTION AND PREFERRED EMBODIMENT

Generally speaking, the present invention provides a process of treating virgin high coarseness fibers with surfactants and adding oils of the type found in newspaper ink to soften the fibers and give the paper containing such fibers properties that aid in mechanical softening operations (e.g., the creping step) on a papermachine. Furthermore, the present invention provides a process of treating high coarseness fibers obtained from recycled newspaper/newsprint (already containing printing ink oils) with surfactants and, if needed, additional printing ink oils to soften the fibers and give the paper containing such fibers properties that aid in mechanical softening operations (e.g., the creping step) on a papermachine. Utilizing the process of the present invention, high coarseness fibers or recycled newspaper/newsprint fibers can be used to produce paper products having levels of softness previously unachievable with such fibers.

The present invention is based upon the discovery that coarse high yield type fibers (i.e. fibers produced by predominantly mechanical separation of wood fibers and typically containing at least 80% by weight of the source material) can produce very soft tissue type products having product qualities comparable to tissue products made from expensive bleached northern softwood kraft fibers. These cellulosic fibers include high coarseness fibers having a coarseness of greater than 17 mg/100 meters. Particularly, soft tissue, type products can be produced from coarse fibers by adding certain oils typically found in used newspaper inks. Prior to adding these oils the coarse fibers are subjected to a surfactant treatment. Soft paper products are then made with the surfactant treated, oil-containing fibers. It is critical in the practice of the present invention that a sufficient quantity of oils be on or in the fibers prior to making tissue or other types of sanitary paper products (e.g. towels, napkins and facial tissues) from such fibers.

In an important aspect of the present invention, soft tissue-type products can also be produced from old newspapers (e.g., recycled newspapers/newsprint) containing certain oil materials typically found in newspapers (e.g., newspaper printing ink oil). This aspect of the present invention is based on the discovery that if the oily component of ink is not removed from coarse fibers in old newsprint and if such fibers are treated with surfactants at conditions insufficient to emulsify/remove the oily component, surprisingly high quality, soft tissue products can be produced. To accomplish this task, a formulation of surfactants is utilized to swell/open-up the fiber, loosen a limited amount of the ink constituents for removal and/or redistribution on the fibers.

Furthermore, if some or all of the oil is removed by deinking (or is not initially present as with virgin fibers), the oil can be added to the fibers after the surfactant treatment but prior to making sanitary paper products from the fibers to obtain the benefits of the present invention.

Vegetable oils and mineral oils are typically used in newspaper printing inks and are found in used newspapers, generally as components of the printing inks. In order to retain oil components of used newspapers, conventional repulping and deinking processes must be modified. The preferred modification of conventional deinking processes is to eliminate saponification conditions in which vegetable type oils (or any oil containing an ester group) are converted into soaps. However, if the oils, are removed during deinking, they can be replaced after a surfactant treatment.

In addition, by avoiding saponification conditions, the alkaline saponification products of fatty acid oils such as vegetable oils and certain fiber components such as hemicellulose are not allowed to leach out of the fibers into the papermachine water system and cause difficulties with the creping operation.

In one embodiment, the method of the present invention employs virgin coarse fibers as a starting material. The virgin coarse fibers are pulped to produce a slurry having a consistency between about 3% to about 18% and a pH below about 8. The slurry is then treated with a surfactant such as a nonionic, cationic or anionic surfactant or a combination of such surfactants at a temperature above about 100° F. for at least 15 minutes. After the surfactant treatment is complete, the slurry is dewatered to a consistency from about 15% to about 35%. The dewatered slurry is then crumbed, thereby producing a crumbed fiber. The crumbed fiber is then passed through a fiber disperser and mixed with about 0.025% to about 2.0% of printing ink oil while maintaining the fibers at a temperature of above 100° F. (desirably about 180° F.). The slurried surfactant treated and oil modified pulp is then used as a source in conventional sanitary paper manufacturing process, preferably a tissue papermaking process. If it is necessary to conduct a screening, cleaning, flotation and/or some washing of the pulp slurry prior to using it as a furnish for making sanitary paper products (e.g. tissue, towel, facial tissues or napkins), it is important that a substantial quantity of the oily contaminants be retained on/in the pulp after such screening, cleaning, flotation and/or washing steps, or else replaced prior to papermaking.

The pulping process of the present invention when using virgin coarse fibers preferably involves pulping the fibers at 6–9% consistency and an elevated temperature, preferably 100° F–180° F. Pulping time can range from 15–60 minutes. The slurry is then cooled to 120° F–150° F. and transferred to a holding chest/blend chest where the pH is adjusted to between pH 4 and 7 (if needed). Surfactant or surfactant combinations are then added to the pulp slurry and allowed to interact with the fibers for a period of at least 15 minutes and preferably for about 30 minutes. The pulp is then dewatered through a press, such as a commercially available Andritz press, to a consistency about between 15% to about 35%. The dewatered pulp is then crumbed using a commercially available crumbing apparatus, such as that from Scott Equipment Co., New Prague, Minn., to produce a crumbed fiber. The crumbed fiber is then passed through a fiber disperser such as a commercially available Micar, manufactured by The Black Clawson Company, Middletown, Ohio, and mixed with printing ink oils while maintaining the fibers at a temperature above about 100° F. (desirably at a temperature of about 180° F.). Desirable oils include, but are not limited to vegetable oils and mineral oils. The amount of oil added and mixed will vary from about 0.025% to about 2.0%, based on the weight of the dry fiber. The fiber temperature may be maintained at the elevated temperature (e.g., 100° F. to 180° F. or greater) by injecting steam when the printing ink oil is mixed with the fibers. Additional screening is unnecessary with the virgin fibers, although screening and/or centrifugal cleaning may be practiced to remove large contaminants, e.g. paper clips, to protect the papermachine. Optionally, limited washing of the surfactant treated and oil containing pulp can be done on the papermachine by using the unwashed pulp in a papermaking furnish on a papermachine.

Preferably the slurry and surfactant treatment steps when using virgin coarse fibers or old newspapers is the same. This treatment is conducted in several stages beginning with slurrying the coarse fibers or newsprint at a consistency of between about 3% and 18% with the surfactant, and preferably at a temperature of the pulp slurry between about 100° F. and 180° F. and maintaining the elevated temperature for at least about 15 minutes. This is followed by adjusting the pH and reducing the temperature of the pulp slurry to a temperature and pH suitable for opening up and swelling the fiber (without saponifying oil that may be present in the fiber). Preferred surfactant treatment conditions are a pH of 4 to 7 and a temperature below about 150° F. and preferably above about 100° F. If pulping of the virgin coarse fibers or newspapers is performed under conditions also suitable for surfactant treatment, pulping and surfactant treatment steps can be combined.

When pulping and surfactant treatment are combined into single step, the surfactant can be added to the water either prior to or after addition of the virgin fibers or newspapers for pulping. Alternatively and/or additionally, a surfactant may be added to the pulp slurry during pulping or after pulping. One or more surfactants may be used. The surfactants may be of the type typically used in contaminant removal in newsprint recycling processes. Suitable surfactants are selected from the group consisting of nonionic surfactants, cationic surfactants and anionic surfactants. Desirably, the surfactant is a nonionic surfactant. Importantly, the pulp is maintained in contact with the surfactant for at least about 15 minutes and preferably about 30 minutes. Although longer contact times for the pulp with the surfactant can be used it is not needed. It is contemplated that contact times for the pulp and surfactant longer than 30 minutes may be helpful when lower amounts of surfactants are used.

After the slurry is treated with one or more surfactants, the slurry is dewatered to a consistency from about 15% to about 35%. One device for performing the "dewatering" operation described herein in connection with the present invention can be obtained from Voith-Sulzer Paper Technology, Appleton, Wis. Other suitable devices will be apparent to those skilled in the art.

After the pulp is dewatered, it is crumbed to control the size of the crumbed fibers. One device for performing the crumbing" operation described herein in connection with the present invention can he obtained from Scott Equipment Company, New Prague, Minn. Other suitable devices will be apparent to those skilled in the art.

Following the crumbing of the fibers, the fiber is passed through a fiber disperser, mixed with printing grade oil, and maintained at a temperature of 180° F. by injected steam. One device for performing this "dispersing" operation described herein in connection with the present invention is a micar which can be obtained from The Black Clawson Company, Middletown, Ohio. Other suitable devices will he apparent to those skilled in the art.

The micar is situated so that it is capable of (1) injecting steam so that the fiber maintains a temperature of about 180° F., (2) and so that printing grade oil can be mixed with the crumbed fibers. The amount of oil that is injected is dependent on the weight of the dry fiber. The oil is added in the amount of about 0.025–3.0% of the weight of air dry fiber.

The method of practicing the present invention when beginning with used newspapers broadly consists of: (1) pulping the newspaper by slurrying the newspapers in water with agitation; (2) treating the used newspaper pulp slurry with a surfactant such as a nonionic, cationic or anionic surfactant or a combination of such surfactants; (3) maintaining the pH of the slurried pulp below about 8.0; and (4) utilizing the slurried surfactant treated pulp as part of the furnish in a sanitary paper manufacturing process, preferably a papermaking process. While screening, cleaning, flotation and some washing of the pulp slurry may be practiced prior to using it as a furnish for making sanitary paper products (e.g. tissue, towel, facial tissues or napkins) it is important that a substantial quantity of the oily contaminants be retained on the pulp after such screening, cleaning, flotation and washing steps or else replaced prior papermaking.

The pulping process of the present invention when using ONP desirably involves pulping the old newspapers at 6–9% consistency and an elevated temperature with a range of about 100° F.–180° F. Pulping time can range from 15–60 minutes. The slurry is then cooled to 100° F.–150° F. and transferred to a holding chest/blend chest where the pH is adjusted to a pH between pH 4 and 7. A nonionic, cationic and/or anionic surfactant is then added. The surfactant is added in an amount ranging from about 0.025% to about 0.75%, by weight, of dry fiber. Of course, the surfactant may be added prior to or during pulping.

Importantly, the surfactant added to the pulp slurry should be allowed to interact with the fibers and the oil for a period of at least 15 minutes and preferably for about 30 minutes. The pH of the slurry is then adjusted to 7 and the pulp is then ready for the papermaking process. Additional screening is not needed although screening and/or centrifugal cleaning may be practiced to remove large contaminants, e.g. paper clips, to protect the papermachine. Optionally, limited washing of the surfactant treated and oil contaminated pulp can be done on the papermachine by using the unwashed pulp in a papermaking furnish on a papermachine. If the pulp slurry is not washed prior to the papermachine, free floating and dissolved material can be washed out on the papermachine forming fabric and removed from the papermachine whitewater by utilizing a flotation step for contaminant removal of papermachine whitewater. This can he done by using a sidehill screen and dissolved air flotation process, such as a Krofta clarifier, to clarify the whitewater for reuse on the papermachine.

As stated above, the slurrying and surfactant treatment steps when using virgin coarse fibers, newsprint, or old newspapers is the same, and is conducted in several stages beginning with slurrying the virgin coarse fibers, newsprint, or old newspapers, at a consistency of between about 3% and 18% with surfactant, and preferably at a temperature of the pulp slurry above about 100° F. and preferably about 180° F. and maintaining it at said elevated temperature for at least about 15 minutes. This is followed by adjusting the pH and reducing the temperature of the pulp slurry to a temperature and pH suitable for maintaining conditions that appear to cause the fibers to open up and swell without saponifying any oils that may be present in the fibers. Preferred surfactant treatment conditions are a pH of 4 to 7 and a temperature below about 150° F. and preferably elevated above about 100° F. If pulping of the virgin coarse fibers, newsprint, or newspapers is performed under conditions also suitable for surfactant treatment, pulping and surfactant treatment steps can be combined.

When pulping and surfactant treatment are combined into a single step, the surfactant can be added to the water either prior to or after addition of the virgin coarse fibers, newsprint, or old newspapers for pulping. Of course, the surfactant may be added directly to the pulp slurry after pulping. The surfactant is desirably the type typically used in contaminant removal in newsprint recycling processes. One or more surfactants can be used and may be selected from the group consisting of nonionic, cationic and anionic surfactants.

The pulp is maintained in contact the surfactant for at least about 15 minutes and desirably for about 30 minutes. Although longer contact times for the pulp with the surfactant can be used it is not needed. Contact times for the pulp and surfactant longer than 30 minutes would appear to be helpful when lower amounts of surfactants are used. When using virgin coarse fibers, newsprint, or old newspapers, a critical component in the above process sequence is having oils of the type typically found in newspaper printing inks in contact with the surfactant treated fibers and retained with the fibers (e.g., retained on and/or in the fibers) during papermaking.

While the inventors should not be held to a particular theory of operation, it is thought that coarse fibers become very suitable for making soft tissue type sanitary paper products due to some modification of fibers by the surfactant which appears to enhance interaction between the fibers and oils. This interaction synergistically improves the tissue making properties of the coarse fibers despite the fact that the fibers remain coarse.

Dyes

Recycled newsprint fibers of the present invention retain inky contaminants and are therefore a light gray color. Tissue products made with a majority of such fibers are preferably dyed to a more pleasant color. The dyes useful in this invention must be water soluble and because of the difficulty of uniformity dying oily contaminated fibers, the dyes should be substantive to cellulosic fibers. Desirably, the dyes are cationic, i.e. they will form positively—charged colored cations when dissociated in water. These dyes are particularly well suited for dyeing mechanical and unbleached chemical pulps. Such pulp fibers contain a significant number of acid groups, with which the positively-charged cations can react by salt formation. These dyes can be selected from among the basic dyes, a group well known from prior art, in which the basic group is an integral part of the chromophore, or from the newer class of cationic direct dyes, in which the basic group lies outside of the molecules resonance system. The dye is preferably added in amounts ranging from 0.01% to 3%, most usefully, at 0.05% to 0.5%, of the weight of air dry fiber. These dyes can be applied at any normal papermaking pH, either acidic or neutral. Their excellent affinity for unbleached fibers allows them to he added to the papermaking system as late as the inlet to the fan pump, but a longer residence time, e.g., introduction at the suction side of the machine chest transfer pump would be preferred. In either case a thick stock location with good mixing is desirable. Of course, dyes other than cationic dyes may be utilized.

Surfactant Treatment

A synergistic result is obtained when surfactant and oil are combined to modify the cellulosic fibers. The minimum effective amount of surfactant to obtain synergy, is the amount needed to open up the fiber rather than the higher levels used for solubilizing oils by emulsifying the oily contaminants at a pH below 8. Desirably, the surfactant is added in an amount of from about 0.025% to about 0.75% based on the weight of fibers. For example, the surfactant may be added in an amount of from about 0.025% to about 0.1% based on the weight of fibers.

While many types of surfactants and surfactant combinations are useful (e.g., nonionic, cationic, anionic surfactants and mixtures), nonionic surfactants appear to provide the most desirable levels of handfeel improvement. A desirable nonionic surfactant is commercially available as DI600® from High Point Chemical Corp. DI600® is an alkoxylated fatty acid, nonionic surfactant specifically developed for flotation type deinking of newsprint. Other nonionic surfactants well known in the art of deinking could be used, such as: Alkyl phenyl ether of polyethylene glycol, e.g. Union Carbide's Tergitol® series of surfactants; alkylphenolethylene oxide condensation products, e.g. Rhone Poulenc, Incorporated's Igepal® series of surfactants; aryl alkyl polyether alcohol, e.g. Rohm and Haas's Triton® X 400 series of surfactants such as Triton X-100. Other suitable nonionic surfactants include Calgon Corporation's ORLENE® series surfactants such as ORLENE® 1070, 1071, 1084 and 1060. In some cases an anionic surfactant may be used depending on the contaminants present in the wastepaper. Examples of suitable anionic surfactants are: ammonium or sodium salts of a sulfated ethoxylate derived from a 12 to 14 carbon linear primary alcohol such as Vista's Alfonic® 1412A or 1412S; and, sulfonated naphthalene formaldehyde condensates, (e.g., Rohm and Haas's Tamol® SN). In some cases, a cationic surfactant can be used, especially when debonding is also desired. Suitable cationic surfactants include compounds such as, for example, CIBA-GEIGY's Amasoft® 16-7 and Sapamine® P; Quaker Chemicals' Quaker® 2001; and American Cyanamid's Cyanatex®.

Although the inventors should not be held to a particular theory of operation, it is thought that swelling of the fiber structure improves the oil modification by assisting the penetration of the oil component into the fiber. Elevated temperature (e.g. above ambient and below 150° F.), use of surfactant, and acid or mild alkaline chemicals can be used in pulping the newsprint and/or coarse fibers to physically open up the lignocellulosic fiber structures so that oil can better penetrate the structures and interact with the fiber to improve handfeel.

Oil Types

Oils of the type typically used in printing, particularly printing of newspapers and in the formulation of ink for such printing, are suitable for practice in the present invention. Mineral oils and vegetable oils are the most common types of oils used in formulating printing inks for newspapers. Mineral oil, also known as white mineral oil, alboline, paraffine, Nujol, Saxol, and lignite oil, is generally classified as CAS #64742-46-7. While historically such oils may have been derived from various sources, commercially they are typically a petroleum distillate fraction with a carbon chain averaging from about 10 to about 14 carbon atoms and usually a mixture of paraffinic hydrocarbons, napthenic hydrocarbons and alkylated aromatic hydrocarbons. Such oils have a specific gravity of about 0.8 to about 0.85, a viscosity at 100° F. of 38-41 SSU (Saybolt Universal Units) and an initial boiling point of about 500° F. (260° C.). Vegetable oils of the type typically used in formulating printing inks can be derived from various sources. Typical is an oil derived from soy beans known as Soya oil, Chinese bean oil, soy bean oil, or just plain soy oil with a chemical abstract service designation CAS #8001-22-7. Such oils are saponifiable with a saponification value of about 185 to 195, a solidifying point of about 5° F. to about 18° F., a melting point of about 70 to about 90° F. and an Iodine value of about 135 to 145. Other vegetable sources of oil and other types of oil suitable for use in printing inks can also be used in the practice of the present invention. For example, the oils discussed above, lanolin oils and their derivatives may be used.

Oil Content

The amount of oil that should be on the fibers(whether on the surface or within the structure of the cellulosic fibers) should be from about 0.025% to about 2%. For example, the oil content may range from about 0.2% to about 2%. When newspaper is being used, then preferably this oil content is obtained by not saponifying or solubilizing oils on used newspapers during pulping and treating the used newspapers and preparing them for use in a papermaking furnish. It is also preferred that the surfactant be used in moderation so as not to wash off oils while preparing newsprint for use in a papermaking furnish for sanitary paper products. When virgin fiber is being used the oil can be added to virgin fibers by either adding oil onto the pulp prior to slurrying, by adding the oil into a water slurry of the fibers so that the oil comes in contact with the fibers prior to subjecting the fibers to surfactant treatment in accordance with the disclosure herein, or preferably by injecting or mixing oil with the fibers in the fiber disperser. According to the invention, the presence of oils on or in the fibers should be from about 0.025% to about 2.0%, for example, from about 0.2% to about 2.0%.

While the synergistic effect is obtained with surfactant and oil modification of cellulosic fibers, it is most beneficial to high yield fibers. Other cellulosic fibers would have their sanitary qualities enhanced by the process of the present invention so that softer more flexible sanitary paper products could be made from such fibers. Such fibers include both northern and southern softwood and hardwood kraft, both bleached and unbleached, bleached and unbleached sulfite fibers in addition to the bleached and unbleached high yield fibers such as stone groundwood fibers, thermomechanical fibers and chemithermomechanical pulp fibers. Specific examples of such fibers are: bleached softwood chemithermomechanical pulp (SWCTMP) ; bleached northern softwood kraft (NSWK) ; bleached recycled fiber (RF) ; bleached eucalyptus kraft pulp (BEK) ; bleached southern softwood kraft (SSWK) ; and bleached hardwood chemithermomechanical pulp (HWCTMP).

The surfactant treated, oil containing fibers of the present invention can be used in conventional papermaking processes for the production of sanitary paper products including toilet tissue grade paper, facial tissue grade paper, paper-towels and paper napkins in accordance with any conventional process for the production of such products. The softness and bulk of such products would be improved by the use of oil-containing fibers of the present invention. Because of the bulk improvements, paper towels produced with fibers of the present invention would be enhanced.

In an aspect of the invention, a surfactant system and/or a mixture of nonionic and cationic surfactants may be added to the surfactant treated, oil containing fibers while the fibers are in the headbox of a papermachine to further enhance the softness of the resulting paper product. It is desirable to add from about 0.01% to about 1.5%, based on the dry weight of the fibers, to the fibers while they are at a papermaking consistency in the headbox (or machine chest) and then forming a paper product from the fibers. Suitable surfactant systems include conventional debonders which may be blends of nonionic and cationic surfactants. Exemplary materials include, but are not limited to, AROSURF® PA-801 and VARISOFT® C-6001, available from Witco Corp.; and Berocell®, available from EKA NOBEL.

In accordance with the present invention, it has been discovered that conventional deinking is counterproductive to making of soft tissue products from used newspapers because it removes oil that can be beneficial to softness of tissue and towel products. The present invention is also based on the discovery that oil of this type used in newsprint is beneficial to softness of tissue and towel products. Softness is difficult to measure or quantify for tissue products because softness is typically perceived by handfeel which is influenced by smoothness and other surface characteristics in addition to sheet puffiness. Handfeel tests have been developed and handfeel data reported herein has been obtained generally in accordance with the following test:

HANDFEEL TEST

Scope

Several different lightweight, dry crepe tissues for use as standards were purchased or were produced from commercially available pulp of differing qualities for imparting softness to tissue products. These tissues were used to define a numerical softness scale. A numerical value was assigned to the softness of each tissue standard.

The softest product manufactured from the commercially available pulp was assigned a handfeel value of 86, and was a lightweight, dry crepe tissue produced with 50% Irving northern softwood kraft fibers and 50% Santa Fe Eucalyptus kraft pulp. The harshest product for use as a standard was produced with 100% bleached softwood chemithermomechanical pulp, (SWCTMP) and was assigned a handfeel value of 20 on the scale. Other lightweight, dry crepe tissue samples for use as standards in defining the "Handfeel Softness" scale and having softness qualities between the softest and harshest tissue standards were produced from different pulp or pulp blends and were assigned handfeel softness values between 20 and 86. The pulps used are further described in the following paragraphs. Tissue manufacturing processes other than the lightweight, dry crepe process and other pulp fibers than those used to produce the standards are capable of producing tissue products outside of the 20 to 86 handfeel softness scale defined by tissue standards described herein. However, for the purpose of establishing the improvement in softness achievable with the present invention, the above defined handfeel softness range of 20 to 86 for lightweight, dry crepe products is accurate and sufficient for comparative purposes. Recycled newsprint fibers of the present invention could produce tissue products having softness values higher than 86 when used in other tissue making process such as the through-dried process or when blended with other fibers.

Pulps used to Produce Handfeel Standards (a) Bleached softwood chemithermomechanical pulp (SWCTMP) (Temcell grade 500/80) having a Canadian Standard Freeness (CSF) of 500 and an ISO brightness of 80 was made from Black spruce and Balsam fir. Pulping was with sodium sulfite pretreatment and pressurized refining followed by alkaline peroxide bleaching to 80° ISO brightness. Kajaani coarseness of the fibers equaled 27.8mg/100 meters and the Kajaani weight average fiber length was 1.7mm.

(b) Bleached northern softwood kraft (NSWK) (Pictou grade 100/0—100% softwood) was made from Black spruce and Balsam fir. Pulping was by the kraft process to Kappa#= 28 followed by $CE_oDED$ bleaching to 88° ISO brightness. Kajaani coarseness equaled 14.3 mg/100 meters and Kajaani weight average fiber length was 2.2 mm.

(c) Bleached recycled fiber (RF) was made from sorted mixed office waste that was pulped, screened, cleaned, and washed to 550° CSF followed by bleaching with sodium hypochlorite to 80° ISO brightness. Kajaani coarseness equaled 12.2 mg/100 meters and Kajaani weight average fiber length was 7.2 mm.

(d) Bleached eucalyptus kraft pulp (BEK) (Santa Fe elemental chlorine free grade) was made from Eucalyptus Globulus pulped to Kappa#=12 by the kraft process followed by $ODE_oD$ bleaching to 89° ISO brightness. Kajaani coarseness equaled 6.8 mg/100 meters and Kajaani weight average fiber length was 0.85 mm.

(e) Bleached southern softwood kraft (SSWK) (Scott Mobile pine) was made from Loblolly and Slash pine and pulped to Kappa# 26 followed by CEHED bleaching to 86° ISO brightness. Kajaani coarseness equaled 27.8 mg/100 meters and Kajaani weight average fiber length was 2.6mm.

(f) Bleached Hardwood Chemithermomechanical Pulp (HWCTMP) (Millar Western grade 450/83/100) having a Canadian Standard Freeness (CSF) of 450 and an ISO brightness of 83 was made from quaking aspen. Pulping was with alkaline peroxide pretreatment and pressurized refining followed by alkaline peroxide bleaching. Kajaani coarseness of the fibers equaled 13.8 mg/100 meters and the Kajaani weight average fiber length was 0.85 mm.

Apparatus

The test method requires no apparatus. The test method uses the procedures and materials described below to evaluate tissue samples using a panel of ten or more people and rank softness of the samples on the softness scale using the product standards of known softness scale values. Some samples were tested by a certified tester using product standards of known softness scale values. Results of the certified tester are identified where used instead of a test panel.

Sample Preparation

1. Five samples to be tested by the panel of evaluators (judges) should be selected.

2. Calculate the number of sample pads and pads of standard samples needed for the test panel of judges for each product to be evaluated for softness using the following equation:

Pads needed (each product)=$(x-1) \times (y)$ x=number of products to be tested y=number of per-sons on the test panel 3. Randomly select a roll of sample tissue for each product being evaluated and discard the first few sheets (to get rid of the tail tying glue).

Prepare sample pads from each roll of product being tested. Each pad should be 4 sheets thick and made from a continuous sample of tissue that is four sheets long. Each pad is made as follows: the four sheet long sample is first folded in half. This results in a double thickness sample that is 2 sheets long. The double thickness sample is then folded in half again to produce a 4 sheet thick, single sheet long sample pad. The folding should be done so that the outside surface of the sheets when it was on the roll of tissue becomes the outside surfaces of the pad. If a product being tested is "two-sided", that is it has different surface characteristics on the outside surface of the sheet versus the surface facing the inside of the roll then the product should be tested twice, once with the surface facing the outside of the roll as the outer surface of the sample pad and also tested with a separate sample pad prepared in which the folding results in the sheet surface facing the inside of the roll becoming the outer surface of the sample pad.

5. Make up the required number of pads from each product using the formula in paragraph 2 above. If more than one roll of a product is needed to prepare the required number of pads, then it is important that stacks of pads be randomized with product from each of the rolls. Code each pad with the batch code in the top left hand corner (on the fold).

6. Select three standards to be used as references by the panel from among the standard tissues as follows:

Select the coarsest sample being evaluated and compare it to standard tissue sample pads and select a lower standard that is slightly coarser than the coarsest sample.

Select the softest sample of product being evaluated and select a standard tissue pad that is slightly higher (softer) than the softest sample being evaluated.

Select a third standard which falls approximately in the middle of the lower and higher standards selected.

The three standard tissue pads selected become the handfeel references for the panel and define the softest, coarsest and midrange.

7. The handfeel references bracket the softness range of the products being evaluated by the panel. For greater accuracy, the highest and lowest references selected should be approximately 30 points apart on the Handfeel Softness Scale.

The middle reference should be eight or more points apart from the lower and higher references.

Panel Member Selection and Instruction

1. Select a panel of about 10 people having about the same number of males and females and with age variations.

2. Ensure the panel members understand the instructions and if necessary, give a "trial run".

3. Panels should be conducted in a quiet location.

Test Procedures

1. Begin the softness test by reading the following Standard Instructions.

STANDARD INSTRUCTIONS

These instructions are to be read to each panel participant before beginning the softness panel test procedure.

a. PURPOSE

"The purpose of this procedure is to compare the softness of toilet tissue samples."

b. METHOD

"You will be given two sample pads of toilet tissue at a time. Compare the two to each other using your dominant hand and make the comparison by feeling each sample with your dominant hand. You may stroke, bend, or crunch the samples as you see fit for making your judgment.

c. "FIRST DECISION"

After feeling each of the two sample pads pair-, you are asked to decide which sample is softer."

d. SECOND DECISION"

Rate the degree of difference in softness between the two pads using the following rating:

The scale uses odd numbers 1, 3, 5, 7, 9. You may use even numbers if you feel that the numbers listed do not fully represent the difference between two products."

PANEL RATING SCALE

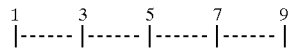

The numbers on the rating scale are defined as:
1. No difference.
3. Very small difference, not confident, someone could miss it.
5. Small difference, confident about judgment
7. Moderate difference, easy to detect, confident
9. Very large difference, very easy to detect, memorable.

e. CALIBRATION

"Before we start I will give you an example of the softest standard to be used for comparison and a sample pad of the least soft (coarsest standard) products. Please handle both. The difference in softness you feel between the two standard references you will rate on the definition scale as 9."(The 9 on the rating scale is the equivalent to the number of handfeel points on the softness scale between the higher and lower references selected for the panel in step 6.)

f. PARTICIPANT REACTION

"Do you have any questions about the test procedure?"

g. REASSURANCE

"Finally, don't agonize too long over each decision. Your opinion is as good as anybody else's. There are no right or wrong answers!

2. Present every combination of sample pads and reference pads to each panel member and ask them to select the preferred sample and then rank the difference using the 1 to 9 rating scale of softness. Each panel member should receive the pairs in random order to avoid sequence errors.

3. Record the results of each pair as XYn. Where X is the preferred sample code, Y is the non-preferred sample code and n is the scale value (1 to 9).

Data Analysis

The paired comparison results are treated as if they belong to a ratio scale. The definition of a ratio scale is given as follows: A scale is a ratio scale if this scale is invariant under positive linear transformations of the form y=x, a>0.

The data pairs and ratio weights for "n" number of pads are loaded into a square matrix A of the following form.

|     | $O_1$           | ...  | $O_n$             |
| --- | --------------- | ---- | ----------------- |
| $O_1$ | $W_1/W_1$     |      | $W_1W_1/W_2W_n$   |
| $O_2$ | $W_2/W_1$     |      | $W_2W_2/W_2W_n$   |
| $O_1$ | $W_n/W_1$     |      | $W_nW_n/W_2W_n$   |

Where $O_i$ are the individual samples and $W_i$ are the scale values (ratio weights) for each pair.

For square matrices of this type the following property exists $$AW = MW$$

Where $W = (W_1, W_2, \ldots W_n)$. The weight vector W is the eigen vector of the matrix A corresponding to its eigen value n. Saaty has shown (See, Saaty, T. L., "A Scaling Method for Priorities in Hierarchical Structures", *Journal of Mathematical Psychology*, 15, 234–281 (1977) and Saaty, T. L., "Measuring the Fuzziness of Sets", *Journal of Cybernetics*, 4 (4), 53–61 (1974)) that to extract the eigen vector W from the estimated weights requires finding the largest eigen value of A ($\gamma$ max). A computer program to solve for X max and W is provided in McConnell, Wes, "Product Development Using Fuzzy Sets", INDA Tenth Technical Symposium, pp. 55–72, Nov. 17–19, 1982. The resulting eigen vector W is the best estimate ratio scale of the paired inputs. Taking the log of each element in this vector creates the more familiar equal interval scale in which the distances between objects are linear. The standard softness values are plotted versus the estimated equal interval scale values and the unknown samples are assigned numerical values by interpolation.

The mean and standard deviation of the standard softness values of each unknown sample are calculated from the calculated standard softness values for all panel members. If any individual panel member value falls outside of 2 standard deviations from the mean, that value is discarded and the mean and standard deviation are recalculated. The mean of the standard softness values with no values outside of 2 standard deviations from the mean is the standard handfeel softness value for that unknown sample.

FEEL SOFTNESS SCALE

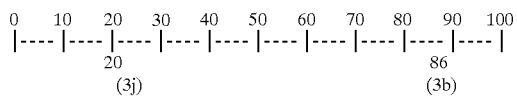

Tensile Strength

Tensile strength values given herein for tissue type paper products are measured by a breaking length test (TAPPI Test Method No- T494om-88) using 5.08 cm sample span and 5.08 cm/minute cross head speed. Typically, tissue strengths are different in the machine direction versus cross machine direction of the sheet. Also, the basis weight of tissue samples vary which affects tensile strength. In order to better compare tensile strengths from various tissue samples it is important to compensate for the differences in basis weight of the samples and for machine directional differences in tensile strength. Compensation is achieved by calculating a "Basis Weight and Directionally Normalized Tensile Strength" hereinafter "Normalized Tensile Strength" or "NTS"). NTS is calculated as the quotient obtained by dividing the basis weight into the square root of the product of the machine direction and cross machine direction tensile strengths. Tensile strength calculations normalized for differences in basis weight and machine direction have been devised for better comparisons of tissue samples. Tensile strengths are measured in both the machine direction and cross machine direction and the basis weight for the tissue sample is measured in accordance with TAPPI Test Method No. T410om-88. When English units of measurement are used, tensile strength is measured in ounces per inch and basis weight in pounds per ream (2880 square feet). When calculated in metric units the tensile strength is measured in grams per 2.54 centimeters and the basis weight is measured in grams per square meter. It should be noted that the metric units are not pure metric units because the test apparatus used for testing tensile is set up to cut a sample in inches and accordingly the metric units comes out to be grams per 2.54 centimeters. Using the abbreviations MDT for machine direction tensile, CDT for cross machine direction tensile and BW for basis weight, the mathematical calculation of Basis Weight and Directionally Normalized Tensile strength (NTS) is:

$$NTS = (MDT \times CDT)^{1/2}/BW$$

NTS in English units=0.060×the NTS in the above defined metric units.

Unit Liquid Absorptive Capacity

Unit Liquid Absorptive Capacity of the paper products is determined by measuring the amount of a liquid absorbed by the paper product after being submerged in a liquid bath at approximately 23° C. and allowed to fully wet out. The liquid bath may contain water, oil or any other liquid for which absorbency results are desired.

More specifically, the absorbency is determined by first cutting a 7.62 mm×7.62 mm specimen of the material to be evaluated, conditioning the specimen at 23° C. and 50% Relative Humidity, and weighing the specimen. This is recorded in units of grams as $W_1$. Two drainage strips should also be cut from the same material.

A wire screen constructed of standard grade reinforced stainless steel wire cloth is lowered into the liquid bath. Using blunt edge tweezers, the specimen is positioned in the liquid bath over the screen and submerged for two minutes.

After two minutes, the specimen is positioned over the screen so that it is aligned with the bottom corner of the screen. The screen is raised and the specimen is allowed to drain for a few seconds before the drainage strip is attached. The specimen with attached drainage strip is then clamped to a specimen holder, hung on a rod over a drainage tank and allowed to drain for 30 minutes. Next, the specimen is detached from the specimen holder by releasing the drainage clamps and placed in a weighing tray of a balance. The wet sample is weighed and this weight is recorded in units of grams as $W_2$.

The liquid weight is obtained from the formula:

$$\text{Liquid Weight} = W_2 - W_1$$

The Unit Liquid Absorptive Capacity (ULA) in Grams per Gram is obtained from the formula:

$$ULA(g/g) = \text{Liquid Weight}/W_1$$

Tests were conducted utilizing distilled or deionized water to determine Unit Water Absorptive Capacity. Unit Oil Absorptive Capacity was determined utilizing white mineral oil (paraffin). Liquid in the liquid bath was changed after each sample to avoid possible contamination by treatments that might be present on the test specimens.

Bulk Measurements

The thickness of paper samples was measured at a loading of 1 kilopascal (1 kPa). Each sample (either one or two ply) was composed of 10 sheets and was free of creases. The samples were tested utilizing a Thwing-Albert VIR II Thickness Tester utilizing a 39.497 mm (+0.25 mm) diameter circular foot at a pressure of 1 kPa and a dwell time of 3 seconds. The results are expressed as mm/10 sheets (as used by the consumer).

TISSUE MAKING PROCESS

The surfactant treated, oil containing fibers of the present invention may be used in any commonly known papermaking process for producing, soft, bulky, sanitary paper webs such as tissue, towel, napkins and facial tissue. Many different papermaking processes including those processes wherein the web is dried via can drying, through drying, thermal drying, and combinations thereof are suitable.

Exemplary of the types of papermaking processes which might be used in conjunction with the present invention are those processes taught in U.S. Pat. No. 3,301,746 to Sanford et al.; U.S. Pat. No. 3,821,068 to Shaw; U.S. Pat. No. 3,812,000 to Salvucci et al.; U.S. Pat. No. 3,994,771 to Morgan, Jr. et al.; U.S. Pat. No. 4,102,737 to Morton; U.S. Pat. No. 4,158,594 to Becker et al.; U.S. Pat. No. 4,440,597 to Wells et al.; and U.S. Pat. No. 5,048,589 to Cook et al.

The preferred papermaking process is commonly known as the dry crepe process. Generally this involves using the paper furnish of the present invention to which dry strength chemicals are preferably added to generate tensile strength and other papermaking chemicals may be added. The paper furnish is then pumped from a machine chest and flows to a headbox and through a slice at 0.1 to 0.4% consistency onto a horizontal surface of a Fourdrinier wire through which water is withdrawn and web formation takes place. The wire cloth is entrained around a breast roll and several table rolls, then to a wire turning roll from which it is fed around a couch roll and several guide rolls back to the breast roll. One of the rolls is driven to propel the Fourdrinier wire. One or more vacuum boxes, (deflectors or hydrofoils may be used between the table rolls to enhance water removal.

The wet web is formed on the upper surface of the Fourdrinier and transferred to a felt by pressing the web onto the felt by means of a couch roll or transferring the sheet to the felt by means of a pick-up shoe. The felt transports the web to a press assembly. The felt then moves around one or two press rolls, one of which may be a suction roll, and then is entrained around guide rolls and rotates back to the couch roll. Showers and guard boards can be used at various positions on the felt surface to assist in web pick-up, cleaning and conditioning the felt surface. The press assembly comprises either a single press roll or an upper and lower press roll. moisture is removed in the nip of the press assembly and transferred into the felt.

The formed and pressed web is transferred to the surface of a rotating drying cylinder, referred to as a Yankee dryer. The drying assembly may also include a hot air hood surrounding the upper portion of the Yankee cylinder. The hood has hot air nozzles which impinge on the web and assist in moisture removal. The hood includes an exhaust to remove air from the hood chamber to control temperature. The web is removed from the drying surface using a doctor blade to impart crepe to the web. To assist in removing the web from the drying surface in a controlled, uniform state, a creping adhesive is applied to Yankee surface using a spray system. The spray system is a series of spray nozzles attached to a header pipe extending across the width of the dryer surf ace. The creping adhesive can be any of the types commonly used in tissue papermaking technology.

The paper web creped from the drying cylinder is passed through a nip formed by a pair of rolls and wound into a large roll referred to as a parent roll. The tissue making process used in the examples can be generally characterized as a light weight, dry crepe process. A 14 inch wide pilot plant scale machine was operated as follows: Prior to web formation the paper furnish is contained in a machine chest where dry strength additives, dyes or other chemical additives are incorporated. The paper furnish is delivered via a fan pump which flows from a headbox through a slice at 0.1% to 0.4% consistency onto the horizontal surface of a Fourdrinier wire through which water is withdrawn and web formation takes place. The wire is entrained around a suction breast roll which aids in water removal and web formation. The wire is entrained around several guide rolls and a wire turning roll and is fed back to the breast roll. One of these rolls is driven to propel the Fourdrinier wire.

The wet web is formed on the upper surface of the Fourdrinier and transferred to a felt by means of a vacuum pick-up. The felt transports the sheet to a pressure roll assembly. The felt moves around one pressure roll, a solid rubber roll, and is entrained around guide rolls and rotates back to the vacuum pick-up. Moisture is removed in the nip of the pressure-roll and transferred into the felt.

The formed web is pressed and transferred to the surface of a rotating drying cylinder, commonly referred to as a Yankee Dryer. The web is removed from the surface of the Yankee at a web dryness between 95% and 96% using a doctor blade. To assist in removing the web from the dryer surface in controlled uniform state, a creping adhesive is applied to the Yankee surface using a spray nozzle. The adhesive mixture used in these examples was a 70/30 mixture of 70% polyvinyl alcohol and 30% of a starch based latex (National Starch Latex 4441).

The paper web creped from the drying cylinder was passed through a nip formed by a pair of rolls and wound into a parent roll of desired size for testing. The paper machine formed a web 14 inches wide and ran at a reel speed of 40 to 50 feet/minute. All of the dry creped tissue samples in the examples were produced at a basis weight of 10 pounds/ream and 18–20% crepe. The samples were converted to 2-ply tissue (20 pounds/ream) for all testing.

The synergistic result from the combination of oils, coarse fibers and surfactants is demonstrated in the following examples. All proportions used herein are by weight unless otherwise specified and fiber weight is based upon the air dried weight of the fiber unless otherwise indicated.

EXAMPLE 1

A dry lightweight creped tissue product was made from a pulp obtained by pulping old newspapers. The tissue product was made by slurrying the pulp with water at 6% consistency. The slurry was raised to a temperature of 180° F. and maintained at the elevated temperature for 30 minutes. A portion of the pulp slurry was cooled and then used directly as a furnish lightweight dry crepe tissue using the papermaking equipment and process described above. The temperature of the remaining portion of the pulp slurry was reduced from 180° F. to 140° F., the pH was adjusted with sulfuric acid to 5.0, and the consistency was adjusted to 5%. Surfactant of the type typically used for deinking pulp was added at the rate of 28 milliliters per 100 pounds of pulp. The slurry was then maintained at 140 F. for 30 minutes, cooled, adjusted to pH 7 with sodium hydroxide and used as furnish for making dry crepe paper tissue with the papermaking equipment and process described above. The cationic dry strength resin Solivtose® N was added to the furnish at a rate of 1% based on the dry weight of the fibers. The control and sample dry crepe tissue was subjected to handfeel testing and tensile testing. The results are reported in Table 1.

TABLE 1

| Description | Handfeel | NTS (Metric) |
|---|---|---|
| Control (ONP) | 41 | 17.5 |
| Surfactant Treated Sample (ONP) | 48 | 13.9 |

EXAMPLE 2

A dry lightweight creped tissue product was made from a pulp obtained by pulping old newspapers. The tissue product was made by pulping with water for 20 minutes at 6% consistency, 150° F. and a pH of about 7. The pulp slurry was divided in half. The first portion of the pulp slurry was maintained at 130° F. for 30 minutes, reduced to a consistency of 3%, washed to a target consistency of 5%, refined at a rate of one horsepower day per ton utilizing a batch refiner, and then used directly as a furnish for lightweight dry crepe tissue using the papermaking equipment and process described above to produce two ply tissue at a basis weight of 16 lbs./ream (i.e., 8 lbs./ream per ply).

Calgon Corp. ORLENE® 1084 was added to the remaining portion of the pulp slurry at a rate of about 0.1%, based on the weight of dry fiber, and then allowed to set for 30 minutes at 130° F. The slurry consistency was then adjusted to 3%, washed to a target consistency of 5%, refined at a rate of one horsepower day per ton utilizing a batch refiner, and then used directly as a furnish for lightweight dry crepe tissue using the papermaking equipment and process described above to produce two ply tissue at a basis weight of 16 lbs./ream (i.e., 8 lbs./ream per ply). The control and sample dry crepe tissue was subjected to handfeel testing, tensile testing, bulk measurements, and oil/water absorptive capacity (absorbency) tests. The handfeel tests were conducted essentially as described above except that a one Certified tester and commercially available reference samples were used instead of a test panel and reference samples from specific pulps. Since only a single set of results per sample was obtained from the Certified tester, the results were not analyzed using the data analysis procedure described above. Test results are reported in Tables 2–5.

TABLE 2

Handfeel (Certified tester)

| NTS (Metric) | Control | Surfactant Treated ONP |
|---|---|---|
| 9.0 | 77 | 80 |
| 10.0 | 75 | 79 |
| 11.0 | 73 | 77 |
| 12.0 | 72 | 77 |
| 12.5 | 65 | 75 |
| 13.0 | 62 | 75 |

TABLE 3

Bulk (mm/10 sheets)

| NTS (Metric) | Control | Surfactant Treated ONP |
|---|---|---|
| 9.0 | 2.53 | 2.57 |
| 10.0 | 2.45 | 2.56 |
| 11.0 | 2.38 | 2.55 |

TABLE 3-continued

Bulk (mm/10 sheets)

| NTS (Metric) | Control | Surfactant Treated ONP |
|---|---|---|
| 12.0 | 2.35 | 2.55 |
| 12.5 | 2.35 | 2.54 |
| 13.0 | 2.33 | 2.54 |

TABLE 4

Absorptive Capacity (Water)

| NTS (Metric) | Control | Surffactant Treated ONP |
|---|---|---|
| 9.0 | 4.90 | 5.30 |
| 10.0 | 4.70 | 5.25 |
| 11.0 | 4.65 | 5.20 |
| 12.0 | 4.55 | 5.15 |
| 12.5 | 4.50 | 5.05 |
| 13.0 | 4.50 | 5.00 |

TABLE 5

Absorptive Capacity (Oil)

| NTS (Metric) | Control | Surfactant Treated ONP |
|---|---|---|
| 9.0 | 4.80 | 5.10 |
| 10.0 | 4.70 | 4.96 |
| 11.0 | 4.70 | 4.80 |
| 12.0 | 4.45 | 4.72 |
| 12.5 | 4.44 | 4.65 |
| 13.0 | 4.40 | 4.65 |

EXAMPLE 3

A dry lightweight creped tissue product was made from a pulp obtained by pulping old newspapers generally in accordance with the procedure described in Example 2. All sample were pulped with water for 20 minutes at 6% consistency, 150° F. and a pH of about 7. The pulp slurry was maintained at 140° F. for 30 minutes. Next, Calgon Corp.

ORLENE® 1084 was added to the pulp slurry at a rate of about 0.1%, based on the weight of dry fiber, and then allowed to set for 30 minutes. The slurry consistency was then adjusted to 3%, washed to a target consistency of 5%, refined at a rate of one horsepower day per ton utilizing a batch refiner. The refined pulp was brought to a papermaking consistency of about 0.1% and introduced to the headbox of a paper machine. At the headbox, a surfactant system was added at rates ranging from 0.10% to 0.40%, based on the weight of dry fiber. The surfactant system was VARISOFT C-6001 available from Witco Corp. The treated pulp was used directly as a furnish for lightweight dry crepe tissue using the papermaking equipment and process described above to produce two ply tissue at a basis weight of 16 lbs./ream (i.e., 8 lbs./ream per ply). The control and sample dry crepe tissue was subjected to handfeel testing, tensile testing, bulk measurements, and oil/water absorptive capacity (absorbency) tests. The handfeel tests were conducted as described for Example 2. Test results are reported in Tables 6–9.

TABLE 6

Handfeel (Certified tester)

| NTS (Metric) | Percent Surfactant at Headbox | Surfactant Treated ONP |
|---|---|---|
| 5.1 | 0.40 | 90 |
| 5.8 | 0.20 | 88 |
| 7.0 | 0.10 | 84 |

TABLE 8

Absorptive Capacity (Water)

| NTS (Metric) | Percent Surfactant at Headbox | Surfactant Treated ONP |
|---|---|---|
| 5.1 | 0.40 | 5.88 |
| 5.8 | 0.20 | 5.70 |
| 7.0 | 0.10 | 5.50 |

TABLE 9

Absorptive Capacity (Oil)

| NTS (Metric) | Percent Surfactant at Headbox | Surfactant Treated ONP |
|---|---|---|
| 5.1 | 0.40 | 5.60 |
| 5.8 | 0.20 | 5.41 |
| 7.0 | 0.10 | 5.18 |

While the present invention has been described in connection with certain embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of making soft, tissue-type sanitary paper products from newspapers, comprising:

pulping newspapers in water with agitation to produce a pulp slurry, the fiber in the newspapers having an oil content ranging from about 0.025% to about 2.0%, by weight, and the slurry having a consistency between about 3% and about 18% and a pH below about 8.0;

adding a surfactant to the pulp slurry and maintaining the pulp slurry at a temperature above about 100° F. for at least 15 minutes such that a substantial quantity of the oil in the old newspaper is retained;

increasing the consistency of the slurry to between about 3.5% and about 18%; and forming the treated pulp into sanitary paper products.

2. The method of claim 1, wherein the surfactant is selected from nonionic surfactants, cationic surfactants and combinations thereof.

3. The method of claim 1, wherein the sanitary paper product is a tissue paper made at a basis weight between 7 and 35 pounds per ream.

4. The method of claim 1, wherein the sanitary paper product is a paper napkin made at a basis weight between 7 and 35 pounds per ream.

5. The method of claim 1, wherein the sanitary paper product is a paper towel made at a basis weight between 12 and 40 pounds per ream.

6. The method of claim 1, wherein the pH of the pulp slurry is maintained between about 4 and 7.

7. The method of claim 1, wherein the pH and chemical additions to the pulp slurry are insufficient to saponify the oily components.

8. The method of claim 1, further comprising a refining step prior to the step of forming the sanitary paper products.

9. The method of claim 1, wherein the surfactant is present in an amount from about 0.025% to about 0.75%, by weight.

10. The method of claim 1, wherein the surfactant is added to the pulp slurry prior to the completion of the pulping step.

11. The method of claim 1, wherein the newspapers are pulped in water with agitation to produce a pulp slurry having a consistency of between about 3% to about 10%.

12. The method of claim 1, further comprising the steps of:

introducing the treated pulp at a papermaking consistency into the headbox of a paper making machine;

adding from about 0.01% to about 1.5% of a surfactant system to the treated pulp; and forming the treated pulp into sanitary paper products.

13. The method of claim 12, wherein the surfactant system comprises a mixture of nonionic and cationic surfactants.

14. The method of claim 12, wherein the treated pulp is at a papermaking consistency ranging from about 1.0% to about 0.05%.

* * * * *